United States Patent [19]

Geka

[11] Patent Number: 4,556,262
[45] Date of Patent: Dec. 3, 1985

[54] DIRECTION CHANGING PATH OF A ROLLER BEARING FOR AN ENDLESS LINEAR MOTION

[75] Inventor: Toshiaki Geka, Funabashi, Japan

[73] Assignee: Nippon Thompson Co, Ltd., Tokyo, Japan

[21] Appl. No.: 553,308

[22] Filed: Nov. 18, 1983

[30] Foreign Application Priority Data

Feb. 15, 1983 [JP] Japan .............................. 58-20371[U]

[51] Int. Cl.[4] ............................................ F16C 29/06
[52] U.S. Cl. .................................................. 308/6 C
[58] Field of Search ...................... 308/6 A, 6 C, 6 R; 464/168

[56] References Cited

U.S. PATENT DOCUMENTS

| | | | |
|---|---|---|---|
| 3,752,541 | 8/1973 | McVey | 308/6 C |
| 4,108,504 | 8/1978 | Ernst et al. | 308/6 C |
| 4,293,166 | 10/1981 | Ernst et al. | 308/6 C |
| 4,463,992 | 8/1984 | Heine | 308/6 C |

Primary Examiner—Stuart S. Levy
Assistant Examiner—Lynn M. Sohacki
Attorney, Agent, or Firm—L. Lawton Rogers, III

[57] ABSTRACT

The invention provides a shape of a wall surface of a direction changing path of a roller bearing for an endless linear motion. The outer wall surfaces of the direction changing path are formed convex outward. This convex outward outer wall surface can be formed as a spherical band with its center of curvature lying on the axis of revolution of the direction changing path. Such outer wall shape allows a minimum play of the rollers of the roller bearing for an endless linear motion during the direction changing motion through the direction changing path. As a result, stick-slip motion as well as the resistance of the rollers during the direction changing motion are reduced. Accordingly, the total the resistance of the roller bearing for an endless linear motion is reduced, producing an improved roller bearing for an endless linear motion as a whole.

10 Claims, 26 Drawing Figures

DIRECTION CHANGING PATH OF A ROLLER BEARING FOR AN ENDLESS LINEAR MOTION

BACKGROUND OF THE INVENTION

The present invention relates to a roller bearing for an endless linear motion in which a casing mounted on a linear track can make an endless linear motion through a plurality of rollers circulating endlessly, and relates in particular to a shape of the wall surfaces of a direction changing path of the rollers installed at the front and rear ends of the casing of the roller bearing for an endless linear motion. The purpose of the invention is to provide a cross-sectional shape of a direction changing path which will not unnecessarily increase the resistance of the rollers. The direction change path semicircularly connects the ends of a load track which is a load zone and a return hole which is a no load zone, and allows a smooth direction changing motion of the rollers. The load track and the return hole are straight paths, are parallel to each other and are in symmetry with respect to a plane.

Figure 1:
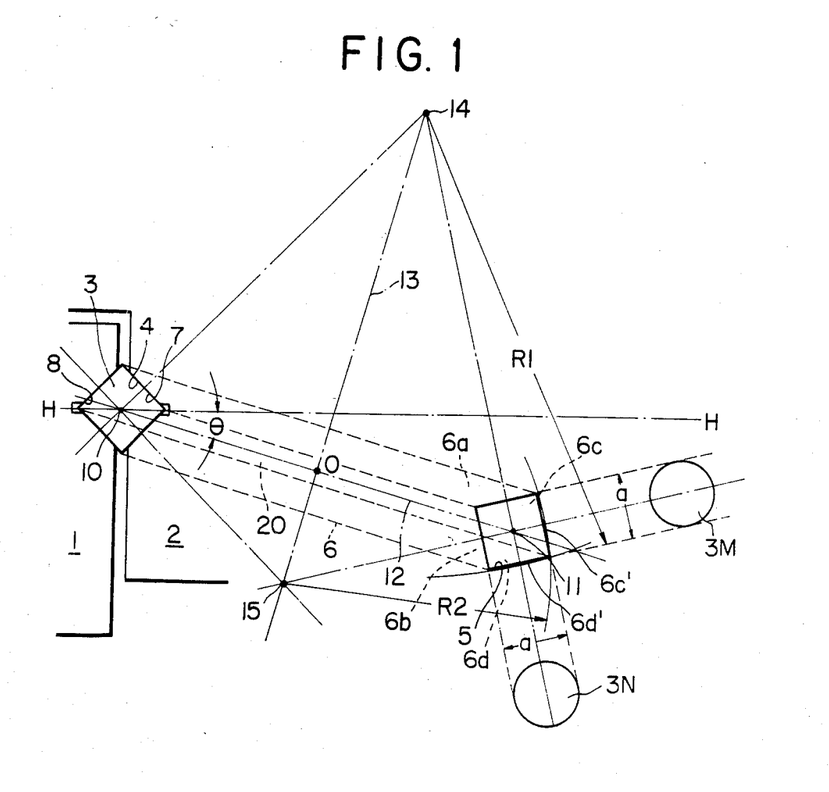
FIG. 1 is a partial elevational cross-sectional view of a first embodiment of the present invention shown by a cross section perpendicular to the direction of movement of a casing.
Figure 2:
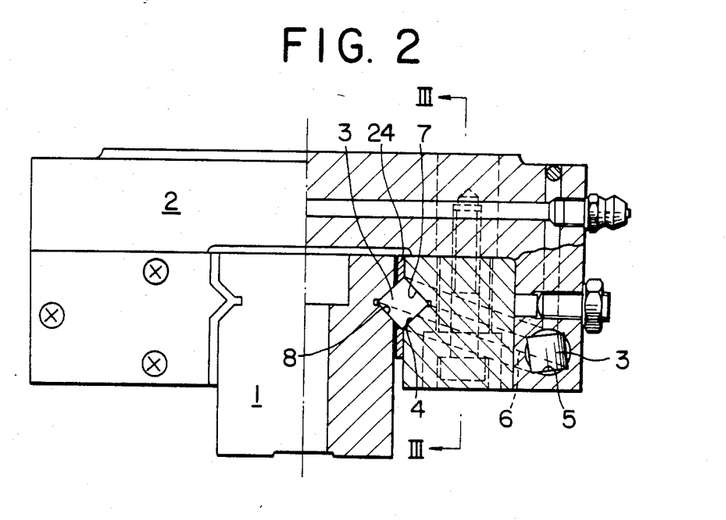
FIG. 2 is a front view of FIG. 3, the right half shown in a cross section taken along the line II—II of FIG. 3.
Figure 3:
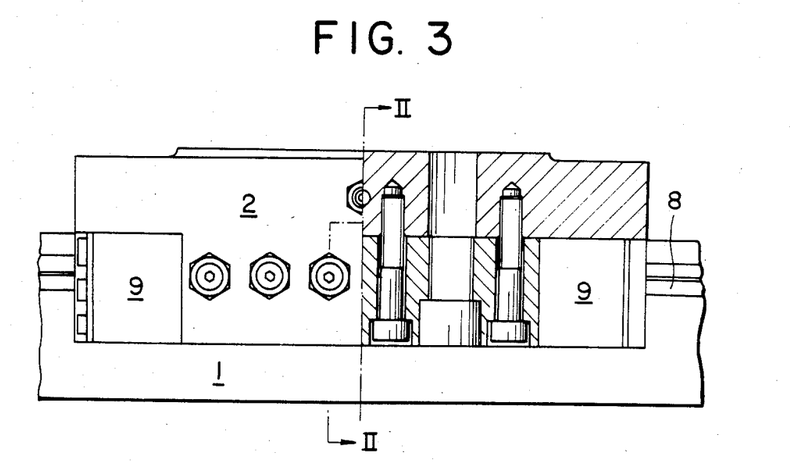
FIG. 3 is a side view of FIG. 2, the right half shown in a cross section taken along the line III—III of FIG. 2.
Figure 4:
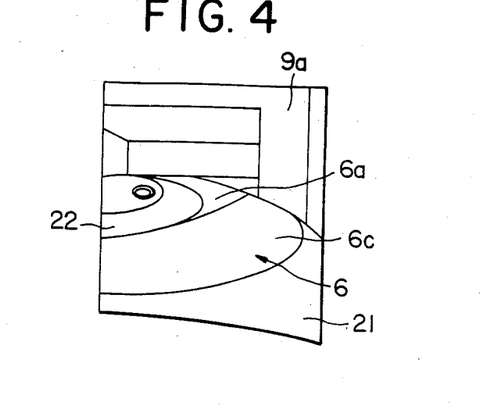
FIG. 4 is a side view of an upper side plate of an embodiment.
Figure 5:
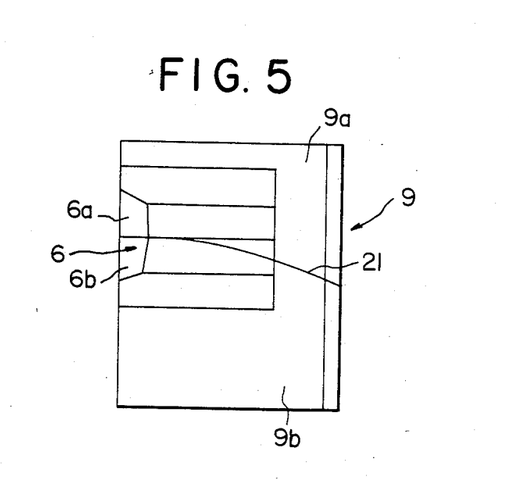
FIG. 5 is a side view of side plates.

An embodiment of the roller bearing for endless linear motion has a construction such as shown in FIGS. 2 and 3. In this embodiment, a casing 2 mounted on a track rail 1 having a linear shape makes an endless linear motion through a plurality of rollers circulating endlessly. The endless circulating path of roller 3 consists of a load track 4 and a return hole 5, both being straight and parallel to each other, and direction changing paths 6 which connect both ends of said load track 4 and said return hole 5 and allow a smooth direction changing motion of the rollers. The load track 4, return hole 5 and direction changing path 6 all have an approximately square cross section, the length of one side thereof being approximately a. The center lines joining the centers of the approximately square cross section of said load track 4, return hole 5 and direction changing path 6 all lie on a same plane which is a center plane 12 (FIG. 1). The shape of the roller 3 is such that, the dimensions of its height and diameter are approximately a.

The load track 4 is formed from a right angle V groove 7 on the casing 2 and a right angle V groove 8 on the track rail 1. The return hole 5 is provided inside the casing 2. The direction changing path 6, is formed in side plate 9 provided respectively at the front and rear ends of the casing 2.

As shown in FIG. 1, the load track 4 and return hole 5 are in symmetry to each other with respect to a perpendicular bisecting plane 13 of a center plane 20 which passes through centers 10, 11 of the rollers rolling respectively in the load track 4 and the return hole, both being linear paths. The direction changing path 6 is a semicircular arc having its center on said center plane 20 so as to connect both ends of the load track and return hole, and the axis of revolution of the direction changing path is the perpendicular bisecting line 13 (in FIG. 1, the perpendicular bisecting line shown same to the perpendicular bisecting plane) which is an intersecting line produced between a plane perpendicular to the center plane at both ends of the load track 4 and the return hole 5, and said perpendicular bisecting plane 13.

Figure 26:
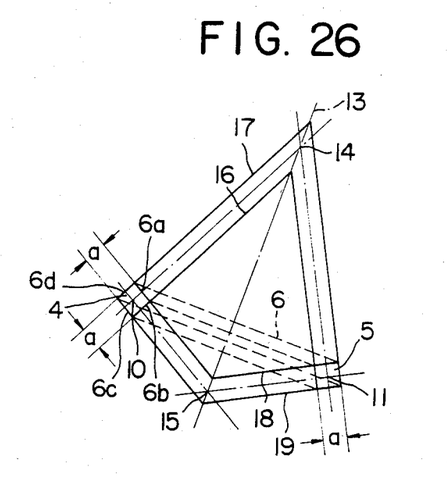
FIG. 26 is an illustrative drawing of the wall surfaces of a direction changing path.

Accordingly, as shown in FIG. 26, the four wall surfaces of the direction changing path 6 are formed basically of surfaces encompassed by inner and outer conical surfaces 16, 17 and 18, 19, respectively, which are orthogonal to each other, respectively, and which are respectively a distance a/2 away from conical surfaces which pass through the centers 10, 11 respectively and have apex at 14, 15 respectively which are intersections of perpendicular bisectors of the respective sides of the square cross sections of the load track 4 and return hole 5 (intersections 14, 15 both lie on the perpendicular bisecting line 13). Among the four wall surfaces of the direction changing path, the inner wall surfaces will be designated as 6a, 6b, and the outer wall surfaces will be designated as 6c, 6d. Further, in FIG. 1, the center plane 20 is shown as a center line 12 joining the centers 10, 11.

As described previously, the diameter and height of the roller 3 are both a, and the cross section taken along the axis of the roller 3 is a square having a side length a. Therefore, both the load track 4 and return hole 5 have a cross-sectional shape which is a square with a side length slightly larger than a so as to allow the roller 3 to roll through. However, when attempt is made to allow the rolling of the roller 3 in a direction changing motion, if the direction changing path has a cross-sectional shape which is a same size as the load track 4 and return hole 5, the roller 3 will become incapable to roll. Further details regarding this point will become clear from the descriptions to be made hereinafter.

In the prior art, the cross-sectional shape of the direction changing path 6 was, in order for the rollers to roll while making a directional change, a square shape having a side length a+X which was considerably larger than the side length of a square section of the load track 4 and return hole 5. Namely, the distance between wall surfaces 6a and 6d and the distance between wall surfaces 6b and 6c was a+X.

The just described direction changing path having an enlarged square cross section resulted in a too large play for the rollers rolling inside said direction changing path. The too large play was the main cause of the so-called "stick-slip" motion and increased the resistance inside the direction changing path. In other words this was one of the causes which increased the resistance of the roller bearing for an endless linear motion as a whole.

The present invention aims to provide a direction changing path of a roller bearing for an endless linear motion in which there will be a less sliding resistance, and in which there will be a smooth direction change of the rollers rolling therein.

The construction of the present invention is as described in the claims. There is provided a direction changing path for the rollers of a roller bearing for an endless linear motion which allows an endless linear motion of a casing mounted on a track rail through endlessly circulating cylindrical rollers. The direction changing path allows the rollers in a load track to make a rolling motion up to a return hole located in a no load zone while making a directional change. The direction changing paths are provided at both the front and rear ends of the casing of the roller bearing. The outer wall surface of said direction changing path is formed by a curved surface of a spherical band which is convex outward with a fixed curvature. As a result, as regards the rollers rolling inside the direction changing path, any roller which axis is directed 90 degrees differently from another roller can have a minimum clearance with the wall surfaces. This assures a smooth direction changing motion and the resistance between the rollers and the direction changing path will become less, thus, the resistance of the roller bearing for an endless linear motion as a whole is reduced. Also, since there is less play the locus of the rollers inside the direction changing path will become more definite. Thus, it becomes possible to accurately determine the number of rollers to be accommodated inside an endlessly circulating path. Accordingly, since the amount of clearance in the row of the rollers can be set to a minimum, it became possible to produce a superior effect such as to essentially improve the load capacity of the roller bearing for an endless linear motion.

BRIEF DESCRIPTION OF THE ACCOMPANYING DRAWINGS

These and other features and advantages of this invention will become apparent from the following detailed descriptions given by way of its preferred embodiments with reference to the accompanying drawings in which.

DETAILED DESCRIPTION OF THE INVENTION

In the following the principle of the present invention will be described with reference to the drawings.

Figure 22:
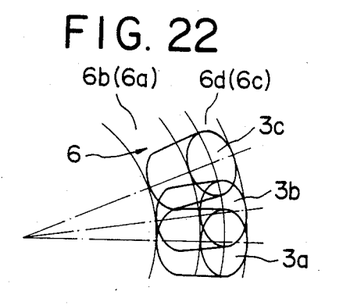
FIG. 22 shows a projection of the rollers rolling in the direction changing path shown in FIG. 18.

As shown in FIG. 22, it is assumed that a roller 3 rolling inside a direction changing path 6, has its end faces slide on and contact an inner wall surface 6b or an outer wall surface 6c, as shown by 3a, 3b, 3c..., while rolling on an outer wall surface 6d and an inner wall surface 6a. In this case, the distance between wall surfaces 6a and 6d can be approximately a. However, the distance between wall surfaces 6b and 6c has to be at least an amount $\delta$ larger, as shown in FIG. 23, due to the direction change of the roller.

Figure 23:
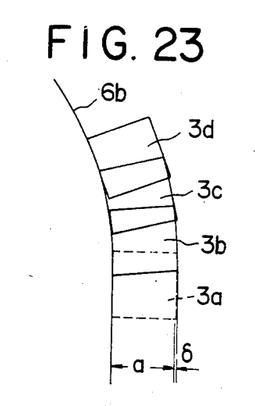
FIG. 23 shows the rollers rolling in the above direction changing path and seen in a direction perpendicular to the plane of revolution of the rollers in said direction changing path.

Similarly, as regards a roller adjacent to said roller shown in FIGS. 22 and 23 and having a roller axis differing 90 degrees, the end faces thereof slide on and contact the wall surfaces 6a or 6d, while it rolls on the wall surface 6b and 6c. Thus, in the same manner as described previously, the distance between the wall surfaces 6b and 6c can be approximately same to the diameter of the roller, but a smooth rolling of the roller can not be obtained, if the distance between the wall surfaces 6a and 6d is not at least $\delta$ larger than the diameter a of the roller.

Accordingly, in prior art, the direction changing path 6, which is a path for the roller 3 formed inside a side plate 9, has been formed by four conical surfaces making a square section and having a side length dimension $a+X$. In other words, the dimension $a+X$ was made larger than $a+\delta$. The dimension a is the length of a side of a square section taken along the axis of the roller 3. Namely, in prior art, the dimensioning was made in such a manner so as to be merely $X > \delta$.

The previously described $\delta$ can be obtained as follows:

As shown in FIG. 26, the wall surface 6b, is a cylindrical surface at a distance r from a center of revolution 15. The wall surface, when said clearance $X=\delta$, is a cylindrical surface having a distance $R=r+a$ from the center of revolution 15. It is assumed that the wall surface 6c is a cylindrical surface having a distance $R_0=R+\delta$ from the center of revolution 15. As is clear from FIG. 24, $$R_0^2 = R^2 + (a/2)^2$$

Namely, $$\delta = R_0 - R = \sqrt{R^2 + \left(\frac{a}{2}\right)^2} - R$$

Accordingly, in the direction changing path of the prior art, the distance between the inner wall surface 6b and the outer wall surface 6c was larger than $(a+\delta)$ at all points in an equal amount.

Similarly, in the prior art, the distance between the inner wall surface 6a and the outer wall surface 6d was made larger than $(a+\delta)$ at all points in an equal amount. As described previously, a roller which height and diameter are both a, will not roll smoothly on the wall surface 6b or the wall surface 6c, unless the distance in the direction of the axis of the roller, namely, the distance between the wall surfaces on which the end faces of the roller slidingly contact, for example, the distance between the wall surface 6a and the wall surface 6d, is at least a+δ. Therefore, there will exist a clearance in the amount of δ between the wall surfaces 6b or 6c and the cylindrical side surface of the roller.

Similarly, in the case when a roller having its axis directed 90 degrees differently from the above described roller, namely, in the case of the wall surfaces 6b, 6c where the end faces of the roller slidingly contact, the roller will not roll on the wall surface 6a or the wall surface 6d, unless the distance between said wall surfaces 6b and 6c is a+δ. Therefore, there will exist a clearance in the amount of δ between the wall surfaces 6a or 6d and the cylindrical side surface of the roller. In the case of the direction changing path 6 of the prior art wherein X>δ as previously described, the clearance will further increase.

Figure 25:
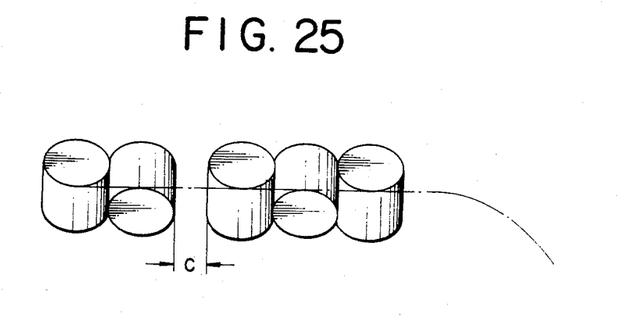
FIG. 25 is an illustrative drawing indicating an amount of clearance in the row of the rollers in an endlessly circulating path.

As a result of the accumulation of the clearances, and as shown in FIG. 25, clearance c of the whole rollers in a row become large. It was revealed that this becomes a great cause for the "stick-slip" motion inside an endlessly circulating path, and particularly for the "stick-slip" motion inside the direction changing path, which increased the resistance of the rollers in the endlessly circulating path and which increased the moving resistance of the roller bearing for an endless linear motion as a whole.

The present invention aims to provide a direction changing path in which it is unlikely to cause a moving resistance as described previously. The construction of the present invention will now be described.

A first embodiment of the present invention is shown in FIG. 1 through FIG. 14. FIG. 1 shows a basic principle of the embodiment. A direction changing path 6 is provided through which a roller 3 (the center of which is 10) rolling in a load track 4 rolls up to a return hole 5 (the center of which is 11) which is located at an angle θ from a horizontal line H—H. The load track 4 and the return hole 5 are in symmetry with respect to a perpendicular bisecting line 13 at a midpoint O of a line segment joining said centers 10 and 11. The cross-sectional shape of the load track and the return hole is essentially a square having a side approximately equal to a, which is the diameter and height of the roller 3. The perpendicular bisecting lines of each side of the square sections of the load track and the return hole respectively pass through center 10 or 11 and intersect with said perpendicular bisecting line 13 at intersections 14, 15, respectively. The direction changing path 6 is formed as a semicircular locus obtained by rotating the square cross section of the load track 4 or the return hole 5 180 degrees around said perpendicular bisecting line 13. A roller 3M shown by a projection in a direction joining center 11 and intersection 15, and a roller 3N shown by a projection in a direction joining center 11 and intersection 14 and which axis is 90 degrees different, are placed alternately, and respectively roll along said direction changing path 6.

As described previously, among the four wall surfaces 6a, 6b, 6c and 6d of the direction changing path, the inner wall surface 6b and the outer wall surface 6c are formed basically by conical surfaces which are respectively a/2 away inward or outward from a conical surface having an apex at the intersection 14 and passing through centers 10, 11. Similarly, the inner wall surface 6a and the outer wall surface 6d are formed basically by conical surfaces which are respectively a/2 away inward or outward from a conical surface having an apex at the intersection 15 and passing through centers 10, 11.

Figure 24:
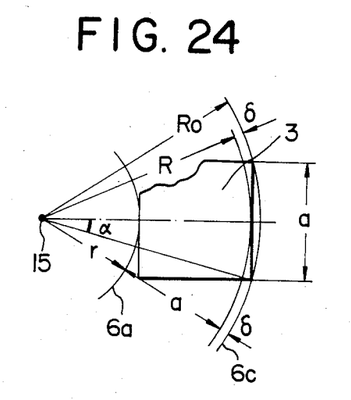
FIG. 24 is an enlarged partial view of above.

As shown in FIG. 24 and as previously described, when the roller 3 is rolling in said direction changing path 6, while one of its end faces facing the perpendicular bisecting line 13 is slidingly contacting the inner wall surface 6a or 6b of the direction changing path 6, the locus of the other end face of the roller 3 will project further outwardly from said outer wall surfaces 6c or 6d. In the case when the inner end face of the roller 3 is slidably contacting the wall surfaces 6a or 6b, the locus of the outer end face of the cylindrically shaped roller can be simply obtained as a surface of revolution which is a locus obtained when each point on the outer end face of the roller is rotated around the perpendicular bisecting line 13. The band shaped both outer wall surfaces formed by this surface of revolution have same positions with the wall surface 6c or 6b at its both edges, and intersect with the adjacent wall surfaces 6a, 6d or 6b, 6c. The band shaped outer wall surface is a surface of revolution which projects outwardly most near the central portion. However, the actual rolling of the roller will be as follows.

Since the roller is cylindrical and rolls on a wall surface of the direction changing path which is conical, firstly the roller tends to roll with the generating line of the conical surface being the axis of rotation, and nextly, the roller is confined by the wall surfaces on which both end faces of the roller are in contact. Thus the roller rolls so that its axis is directed to a new generating line of the conical surface. Namely, the roller is adjusted so that its axis is parallel to the generating line of the conical surface. Thus the roller rolls in the direction changing path with this continuous composite motion.

Accordingly, as shown in FIG. 1 the previously described locus will have a shape approximately similar to, a wall surface 6d' formed by a spherical band having a center at the intersection 14 and a radius $R_1$ up to both edges of the wall surface 6d, and to a wall surface 6c' formed by a spherical band having a center at the intersection 15 and a radius $R_2$ up to both edges of the wall surface 6c.

The difference between the previously described spherical band shape and the strict locus will actually be within a manufacturing tolerance, thus in actual practice there will be no problem.

Also, since the wall surface shape of said wall surfaces 6c' and 6d' are a simple spherical surface, in case of performing a turning operation of the direction changing path, by dividing the direction changing path 6 into two at a side plate 9 and making into an upper side plate 9a and a lower side plate 9b, as shown in FIGS. 4 through 12, there are advantages that the processing is easy and the manufacturing cost is low.

The spherical surface shaped wall of the direction changing path gradually changes to a flat surface toward both ends of the return hole.

In an embodiment of a side plate 9, as shown in FIGS. 4 through 12, it is divided into an upper side plate 9a and a lower side plate 9b by a dividing plane 21 which is parallel to the central plane 20 shown in FIG. 1, said dividing plane 21 being the plane passing through the intersection of the outer wall surfaces 6c and 6d of the wall surfaces of the direction changing path.

Further, the upper side plate 9a is provided with a positioning concave surface 22 at its central portion, and the lower side plate 9a is provided with a positioning convex surface 23 at its central portion which abuts said concave surface 22. By dividing the side plate 9 into two, as an upper side plate 9a and a lower side plate 9b, each of the wall surfaces 6a, 6b, 6c and 6d can be processed extremely easily with a very high accuracy.

Figure 6:
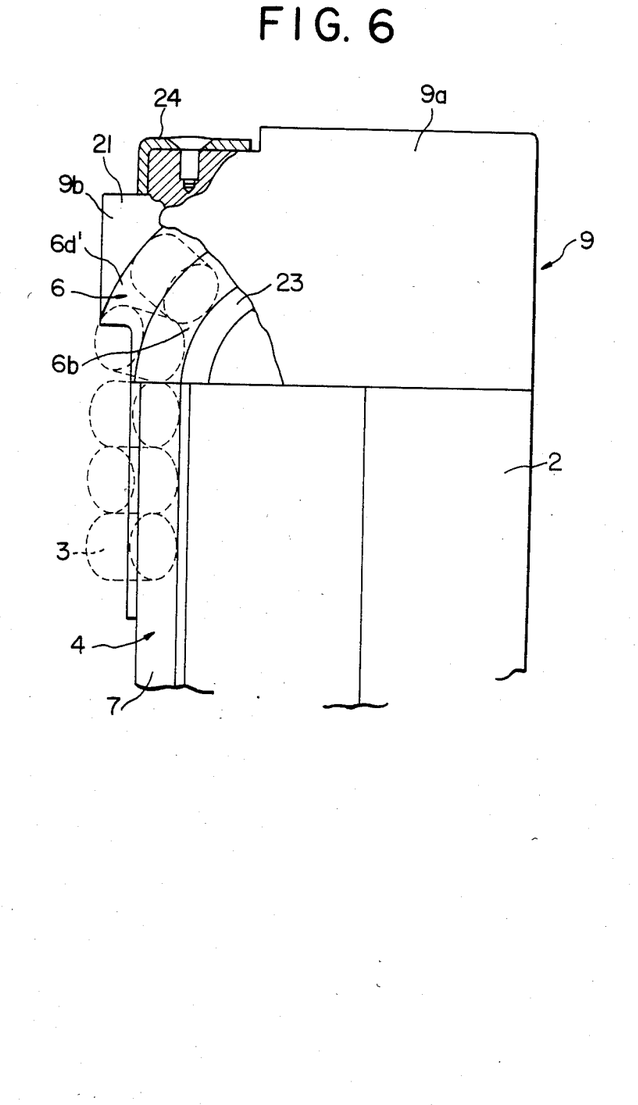
FIG. 6 is a plan view taken along the center line of a load track in a casing.
Figures 7, 8, 9:
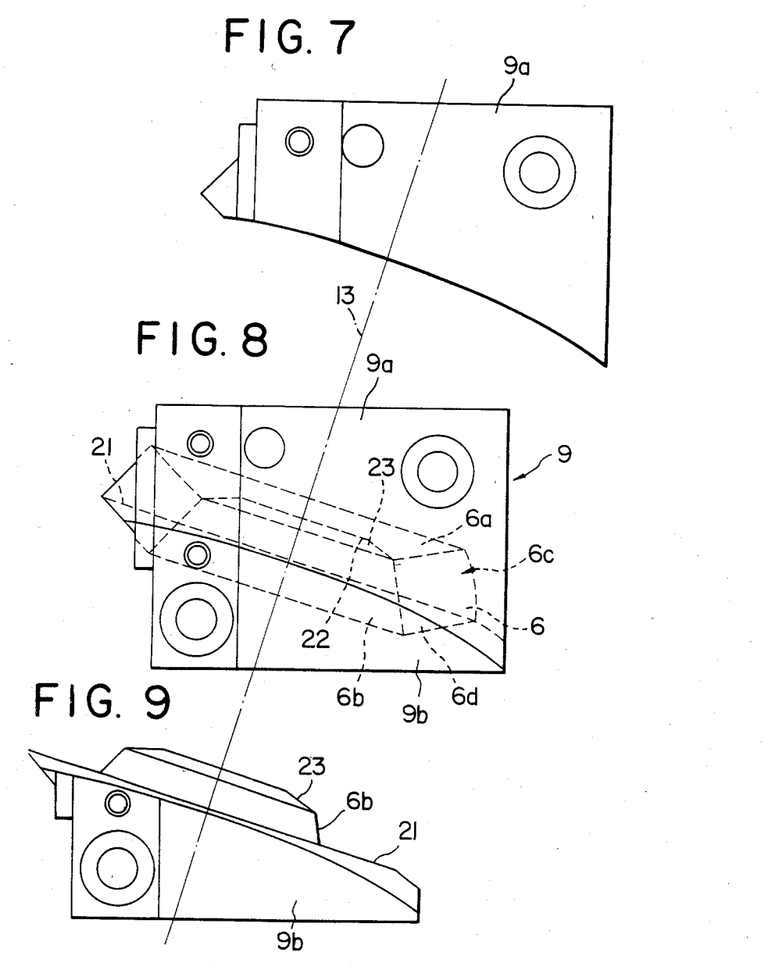
FIG. 7 is a side view of an upper side plate seen from an outer side.
FIG. 8 is a side view of the side plates.
FIG. 9 is a side view of a lower side plate of above.
Figure 10:
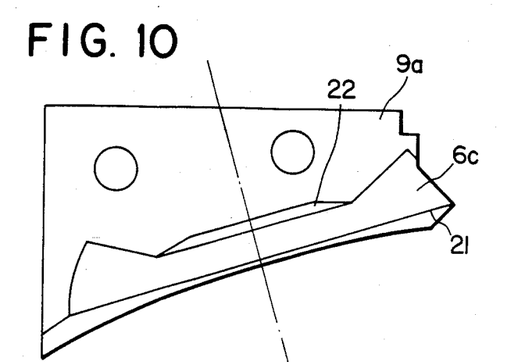
FIG. 10 is a side view of an upper side plate seen from an inner side.
Figure 11:
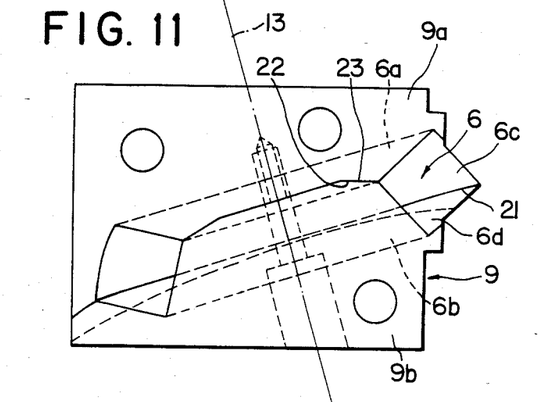
FIG. 11 is a side view of side plates.
Figure 12:
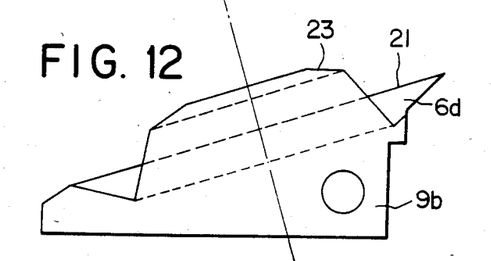
FIG. 12 is a side view of a lower side plate of above.
Figure 13:
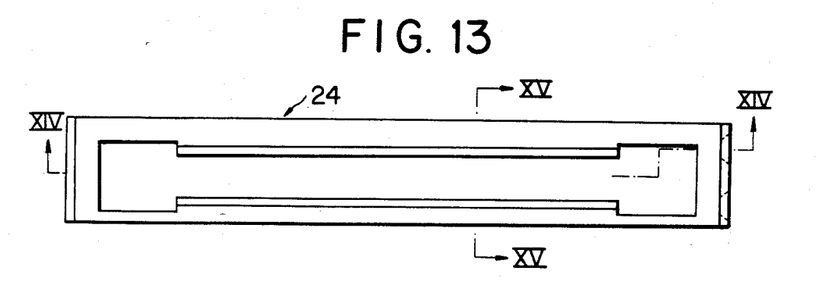
FIG. 13 is a side view of a retainer.
Figure 14:
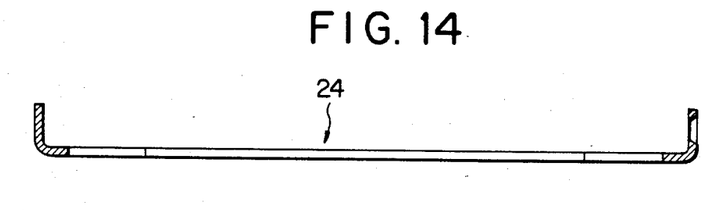
FIG. 14 is a cross-sectional view taken along the line XIV—XIV of FIG. 13.
Figure 15:
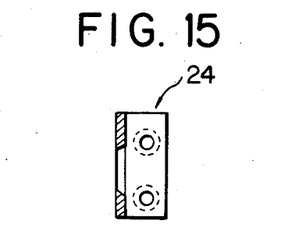
FIG. 15 is a cross-sectional view taken along the line XV—XV of FIG. 13.

Further, as shown in FIGS. 2 and 6, a retainer 24, which prevents the rollers in the load track from dropping off in case the casing 2 is removed from the track rail 1, is provided, and is fastened on to the casing at its both ends by screws. The detailed shape of the retainer 24 is shown in FIGS. 13 through 15.

In the previously described embodiment, although the side plate shown is divided into two, naturally, the side plate can be made in one piece, such as by injection molding, etc. Also, it is possible to make a portion of the side plate integral with the casing.

Nextly, the function and effect of the present invention will be described.

The direction changing path 6 belongs to a no load zone of an endless circulating path for the rollers same to the return hole 5. Therefore, the direction change of the rollers is possible without being imposed by a particularly large force.

As described previously, the direction change of the roller 3 in the direction changing path is made by a rolling between the cylindrical side surface of the roller and the wall surface of the direction changing path, and by a twisting motion which directs the axis of the roller towards intersections 14 or 15 due to the contact of the end faces of the roller with the wall surface which is positionally perpendicular to the previously described wall surface.

As shown in FIG. 1, the rollers 3, including both the one in state 3M and the one in state 3N, roll on by completely contacting the inner surfaces 6a, 6b and contacting the wall surfaces 6c', 6d' at its edge portion. In this case, since the roller is in a no load zone, the direction change can be made only by the contact of the edge portion of the roller and also there will hardly be any unnecessary clearance between the roller and the direction changing path. Accordingly, there will occur no play in contrast to the case of a direction changing path of the prior art, and the occurrence of "stick-slip" motion has been sharply reduced, and the sliding resistance of the roller bearing for an endless linear motion as a whole was reduced.

Figure 17:
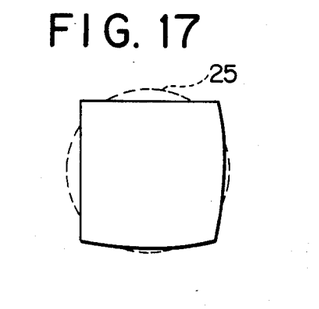
FIG. 17 is an enlarged cross-sectional view at a portion where the direction changing path of above FIG. 16 communicates with a return hole.

Since the return hole and the direction changing path are both in a no load zone, it is not necessary for the roller to have its surface contact completely. Namely, as shown in FIG. 17, the manufacturing process can be further simplified by firstly drilling a preparation hole 25 having a diameter smaller than the diagonal of the square section, and by nextly processing an approximately square section which forms the wall surfaces of the return hole or the direction changing path.

Figure 16:
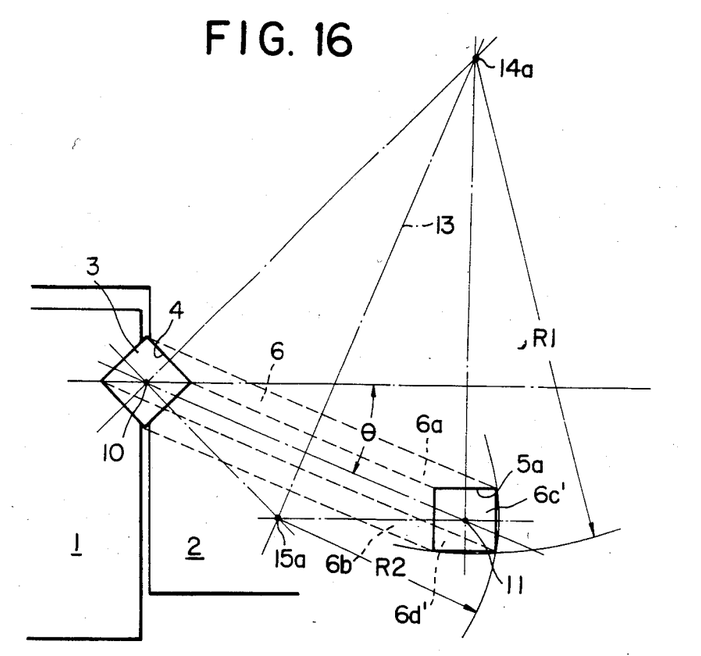
FIG. 16 is a partial elevational cross sectional view of an embodiment wherein $\theta$ in FIG. 1 is $\theta=22.5°$.

In FIG. 16, there is shown the previously described embodiment wherein $\theta = 22.5°$, and in which there is shown a positional relationship among the return hole 5a, direction changing path 6, perpendicular bisecting line 13, and intersections 14a, 15a. In this case, the return hole is in a position where it is formed by a horizontal plane and a vertical plane. The intersection 14a is located at a vertical direction of the center 11 of the return hole 5a, and the intersection 15a is located at a horizontal direction of the center 11. In this case, there is effect that the return hole 5a can be processed very easily.

Figure 18:
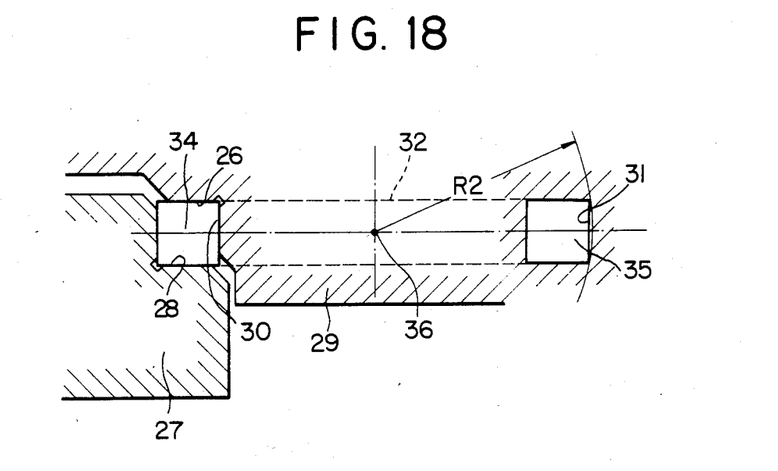
FIG. 18 is a partial elevational cross-sectional view showing a second embodiment.
Figure 19:
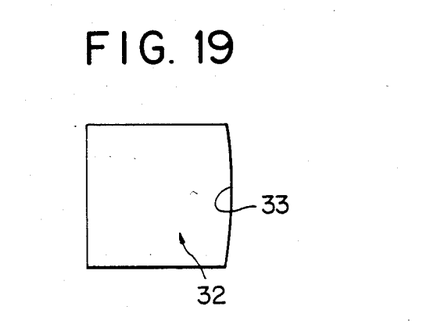
FIG. 19 is an enlarged cross-sectional view of the direction changing path of above.

FIG. 18 shows a second embodiment of the invention. In this embodiment, a right angle V groove 28 on a track rail 27 and a right angle V groove on a casing 29 form a load track 26 and the side walls of said V grooves are all positioned either horizontally or vertically. If a return hole 31 is located horizontally to the load track 26, a direction changing path 32 is also provided in a horizontal position. Thus, as shown in FIG. 19, the wall surfaces of the direction changing path is only necessary to have one outer wall surface 33 be made to a surface of a spherical band. The center of the spherical band surface is the midpoint 36 between a center 34 of the load track and a center 35 of the return hole 31. In this case, not only the processing of the return hole but the processing of the direction changing path will become very easy.

Figure 20:
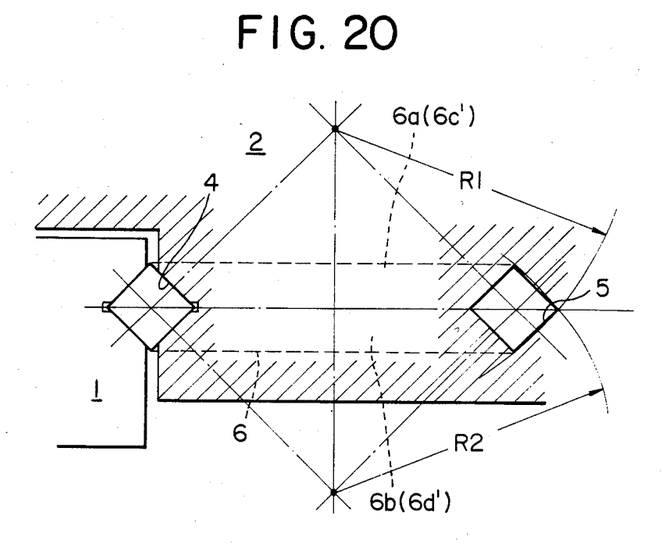
FIG. 20 is a partial elevational cross-sectional view showing a third embodiment.
Figure 21:
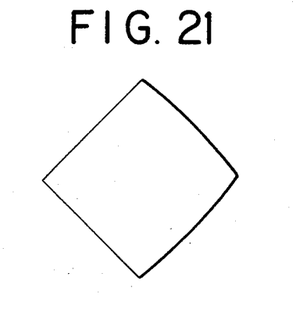
FIG. 21 is an enlarged cross-sectional view of the direction changing path of above.

A third embodiment of the invention is shown in FIG. 20. In this case, the return hole 5 of the first embodiment is located at a position in which the center of the return hole lies on a horizontal diagonal of the load track 4. In this case, the outer wall surfaces 6c', 6d' of the direction changing path 6 are formed by spherical bands having a same radius $R_1 = R_2$, and thus the processing of the direction charging path will become easy.

I claim:

1. A direction changing path of a roller bearing for an endless linear motion wherein a casing mounted on a linear track rail makes an endless linear motion through a plurality of rollers circulating endlessly, characterized in that said direction changing path is provided in the casing and is of a semicircular shape connecting both ends of each of a load track and a return hole for allowing a smooth direction changing motion of the rollers, in that the cross section of said direction changing path is approximately square in shape and in that, among the four side wall surfaces forming said direction changing path, the radially outer two adjacent wall surfaces each have an outwardly bulging spherical surface, the center of curvature of each of said adjacent outwardly bulging spherical surfaces being located at the point of intersection of the extensions of the longitudinal axes of two rollers when located at the two extremities of the said direction changing path with the longitudinal axes thereof extending in the same general direction.

2. In a generally square cross-section track for the plurality of rollers of a roller bearing for endless linear motion, said track including a load zone, a no-load zone and two semicircular direction changing zones connecting said load and no-load zones at the ends thereof, the radially outer two surfaces in said direction changing zones being inwardly concave, the improvement wherein the center of curvature of said two radially outer surfaces is located at the intersection of the extensions of the longitudinal axis of two of said rollers when positioned at the extreme ends of said direction changing zone.

3. The track of claim 2 wherein said two radially outer surfaces have the shape of a band of a sphere centered at said intersection.

4. The track of claim 3 wherein the angle between the horizontal and the line intersecting the center of said rollers when positioned at said extreme ends of said direction changing grooves is approximately 22.5 degrees.

5. The track of claim 3 wherein the track defining surfaces thereof in said no-load zone are either generally horizontal or generally vertical.

6. The track of claim 2 wherein the angle between the horizontal and the line intersecting the center of said rollers when positioned at said extreme ends of said direction changing grooves is approximately 22.5 degrees.

7. The track of claim 2 wherein the angle between the horizontal and the line intersecting the center of said rollers when positioned at said extreme ends of said direction changing grooves is approximately 90 degrees.

8. The track of claim 2 wherein the track defining surfaces thereof in said load and no-load zones are inclined to the vertical at an angle of about 45 degrees.

9. In the generally square cross-section track for the plurality of rollers of a roller bearing for endless linear motion, said track including a load zone, a no-load zone and two semicircular direction changing zones connecting said load and no-load zones at the ends thereof, the improvement wherein the track defining surfaces thereof in said load and no-load zones are either generally horizontal or generally vertical and the radially outer surface of both of said direction changing zones is inwardly concave, the center of curvature of said outer surfaces being located at the midpoint of the line joining the center of two of said rollers when positioned at the extreme ends of said direction changing zone.

10. The track of claim 9 wherein said radially outer surface has the shape of a band of a sphere centered at said midpoint.

* * * * *